(12) United States Patent
Valero et al.

(10) Patent No.: US 7,524,478 B2
(45) Date of Patent: *Apr. 28, 2009

(54) LOW WATER UPTAKE SILICAS

(75) Inventors: Remi Valero, Lyons (FR); Yvonick Chevallier, Saint-Romain-Au-Mont-d'Or (FR)

(73) Assignee: Rhodia Chimie, Aubervilliers (FR)

( * ) Notice: Subject to any disclaimer, the term of this patent is extended or adjusted under 35 U.S.C. 154(b) by 650 days.

This patent is subject to a terminal disclaimer.

(21) Appl. No.: 10/500,107

(22) PCT Filed: Dec. 24, 2002

(86) PCT No.: PCT/FR02/04559

§ 371 (c)(1),
(2), (4) Date: Jun. 25, 2004

(87) PCT Pub. No.: WO03/055801

PCT Pub. Date: Jul. 10, 2003

(65) Prior Publication Data

US 2005/0074386 A1      Apr. 7, 2005

(30) Foreign Application Priority Data

Dec. 26, 2001   (FR) .................... 01 16881

(51) Int. Cl.
    C01B 33/12    (2006.01)
    C01B 33/18    (2006.01)
    C01B 33/187   (2006.01)
    C01B 33/193   (2006.01)

(52) U.S. Cl. .................. 423/335; 423/338; 423/339

(58) Field of Classification Search ........... 423/335, 423/338, 339
    See application file for complete search history.

(56) References Cited

U.S. PATENT DOCUMENTS

| | | | | |
|---|---|---|---|---|
| 4,590,052 A * | 5/1986 | Chevallier et al. | ........... | 423/335 |
| 4,708,859 A * | 11/1987 | Chevallier | ........... | 423/339 |
| 4,842,838 A * | 6/1989 | Chevallier | ........... | 423/339 |
| 5,066,420 A * | 11/1991 | Chevallier | ........... | 516/82 |
| 5,236,623 A * | 8/1993 | Chevallier | ........... | 516/82 |
| 5,395,605 A * | 3/1995 | Billion et al. | ........... | 423/339 |
| 5,403,570 A * | 4/1995 | Chevallier et al. | ........... | 423/339 |
| 5,547,502 A * | 8/1996 | Chevallier et al. | ........ | 106/287.1 |
| 5,587,416 A * | 12/1996 | Chevallier et al. | ........... | 524/492 |
| 5,846,311 A * | 12/1998 | Bomal et al. | ........... | 106/492 |
| 5,876,494 A * | 3/1999 | Bomal et al. | ........... | 106/492 |
| 5,882,617 A * | 3/1999 | Chevallier et al. | ........... | 423/339 |
| 5,932,191 A * | 8/1999 | Chevallier et al. | ........... | 424/52 |
| 5,958,127 A * | 9/1999 | Bomal et al. | ........... | 106/492 |
| 6,001,322 A * | 12/1999 | Chevallier et al. | ........... | 423/339 |
| 6,169,135 B1 * | 1/2001 | Chevallier et al. | ........... | 524/492 |
| 6,191,205 B1 * | 2/2001 | Micouin et al. | ........... | 524/492 |
| 6,214,912 B1 * | 4/2001 | Chevallier et al. | ........... | 524/269 |
| 6,221,149 B1 * | 4/2001 | Bomal et al. | ........... | 106/492 |
| 6,290,924 B1 * | 9/2001 | Chevallier | ........... | 423/335 |
| 6,335,396 B1 * | 1/2002 | Chevallier et al. | ........... | 524/492 |
| 6,468,493 B1 * | 10/2002 | Chevallier et al. | ........... | 423/339 |
| 6,521,214 B1 * | 2/2003 | Amiche et al. | ........... | 424/49 |
| 6,702,888 B2 * | 3/2004 | Bomal et al. | ........... | 106/492 |
| 7,033,576 B2 * | 4/2006 | Chevallier et al. | ........... | 424/49 |

FOREIGN PATENT DOCUMENTS

| | | |
|---|---|---|
| EP | 0 754 650 | 1/1997 |
| EP | 0 881 252 | 12/1998 |
| WO | 95 09127 | 4/1995 |
| WO | 95 09128 | 4/1995 |
| WO | 01 07364 | 2/2001 |

* cited by examiner

Primary Examiner—Timothy C Vanoy
Assistant Examiner—Serena L Hanor
(74) Attorney, Agent, or Firm—Buchanan, Ingersoll & Rooney P.C.

(57) ABSTRACT

The invention concerns a method for preparing low water uptake precipitated silicas, comprising successive steps which consist in: (a) producing an initial starter including a silicate, the silicate concentration in said starter, expressed in $SiO_2$ equivalent, being less than 15 g/L; (b) bringing the medium pH to a value ranging between 7 and 8 by adding an acidifying agent, (c) in the resulting medium, simultaneously adding a silicate and an acidifying agent the respective amounts of silicate and acidifying agent added in time being specifically such that, during the entire addition (1) the reaction medium pH stays between 7 and 8, and (ii) the silicon concentration in the medium, expressed in $SiO_2$ equivalent, stays below 35 g/L; (d) adding an acidifying agent in the medium resulting from step (c), so as to bring the medium to a pH ranging between 3 and 6.5; and (e) filtering the resulting aqueous silica dispersion, then drying the filter cake obtained at the end of the filtering step. The invention also concerns low water uptake silicas obtained by said method and their use, in particular for reinforcing silicones or polymer or elastomer matrices.

28 Claims, No Drawings

LOW WATER UPTAKE SILICAS

The present invention relates to a process for preparing precipitated silica, especially in the form of powders, granules or substantially spherical pellets, and having low water uptakes. The invention also relates to the resulting precipitated silicas, and to the use thereof, in particular for reinforcing silicone elastomer or silicone paste-based matrices.

In silicone elastomer or silicone paste-type compositions, fumed silicas, i.e. silicas obtained by a process consisting in reacting tetrachlorosilane-type compounds at a high temperature with hydrogen and oxygen, such as those described, for example, in *Angewandte Chemie*, Vol. 72, p. 744 (1960), have been used for a number of years as reinforcing fillers.

However, as a result of their obtention process, combustion silicas are generally expensive. For this reason, efforts have quickly been made, in applications for reinforcing silicone matrices, to replace these expensive silicas, at least partially, by so-called 'precipitated' silicas, which are obtained by precipitating a silica in an aqueous medium from a precursor, such as a silicate, under appropriate pH conditions. These silicas are less expensive, and they may have requisite dispersibility features in a silicone-based matrix.

However, in the most general case, precipitated silicas have often been found to have a strong affinity for water. This seems to stem, at least in part, from the fact that the mechanism used during the precipitation of said silicas, which is often complex, generally entails simultaneous poorly controlled phenomena of nucleation, growth and coagulation that usually result in hygroscopic Si—OH groups forming at the surface of the resulting silica particles.

Generally, the affinity of a silica for water is reflected, in particular, by its so-called 'water-uptake' feature, which points to the more or less marked tendency of water molecules to become adsorbed on its surface. Generally, the 'water uptake' of a silica is measured by a test that consists in placing a silica sample that was previously dried, generally under a very low degree of relative humidity and at a temperature higher than 100° C., in given relative humidity conditions for a predefined length of time, as a result of which the silica hydrates, which causes the mass of the sample to go from an initial value m (in the dried state) to a final value (m+dm). The 'water uptake', which corresponds to the amount of water incorporated into the sample based on the mass of the sample in the dry state, is equal to the ratio dm/m, expressed as a percentage.

The 'water uptake' of a silica is therefore a relative value, which depends on the drying and hydration conditions used in the water-uptake test that is carried out. In order to establish a univocal definition of this feature in the sense of the invention, the term 'water uptake of a silica' will be used specifically, throughout the rest of the description, to denote the dm/m ratio, expressed as a percentage, calculated for a sample of the silica subjected to the following conditions during the test:

preliminary drying: 8 hours, at 105° C.;

hydration: 24 hours, at 20° C., and under a relative humidity of 70%.

Thus, in order to determine, in the sense of the invention, the 'water uptake' of a silica, the experimental protocol used may typically consist in:

exactly weighing a mass of about 2 g of the silica to be tested;

drying the so weighed silica for 8 hours in an incubator set at a temperature of 105° C.;

determining the mass m of the dried silica resulting from this drying step;

placing the resulting dried silica in a closed container (in a desiccator, for example) containing a water/glycerin mixture having a water/glycerin mass ratio of 35/65, at 20° C. for 24 hours, such that the relative humidity of the closed medium is 70%;

determining the mass (m+dm) of the silica resulting from this treatment over 24 hours at 70% relative humidity, this mass being measured immediately after the silica leaves the desiccator, so as to avoid variation in the mass of the silica under the effect of the change in hygrometry between the medium at 70% relative humidity and the atmosphere of the laboratory.

In the sense of the definition of the invention, most usual precipitated silicas generally have water uptakes greater than 7%, and usually greater than 9%. Thus, the water uptakes of usual precipitated silicas are typically of about 8 to 10%, and it is seldom that precipitated silicas have water uptakes of less than 6.5%.

Such an affinity for water is often a nuisance when the silicas are used to reinforce silicone matrices. Indeed, it is generally preferable for a silica intended for reinforcing a silicone matrix to be characterized by an affinity for water as weakest as possible. Moreover, in the particular case of silicone elastomers used as insulating materials, in electrical wiring, for example, it is essential that the silicas used as a filler contain as little water as possible, especially so as not to damage the dielectric properties of the material.

Furthermore, the presence of water in a silica used as a reinforcing filler in a silicone matrix is liable to cause bubbles to form in said matrix when it is shaped by extrusion, which is an unacceptable defect in the extruded part.

Given these elements, it is therefore evident that precipitated silicas that are intended to be used as a reinforcing filler in silicone-based matrices should have not only high dispersibility within said matrices, but also the lowest possible water-uptake values.

The precipitated silicas of the prior art, however, rarely have such features.

In order to provide silicas that meet the dual requirement of dispersibility in a silicone-based matrix and low affinity for water, it has been considered to implement a treatment known high water-uptake precipitated silicas, so as to reduce their affinity for water.

In this context, it has been proposed, for example to render the surface of precipitated silicas hydrophobic, especially by using silane or silazane-type agents, as in application FR 2 356 596. This type of hydrophobizing treatment is, however, generally relatively expensive.

Another solution for treating high water-uptake precipitated silicas, described in application EP 0 280 623, consists in thermally treating a precipitated silica at 700 to 950° C., preferably by using the initial silica, in the form of pellets, in a tilted rotary furnace. When this process is less expensive than that of FR 2 356 596, it nevertheless still involves the implementation of two distinct steps, of preparation and of subsequent treatment, which increases the costs in the scope of an industrial implementation of the process.

Now, the inventors have discovered that a precipitated silica having dispersibility and water-uptake features that are especially suitable for use in reinforcing silicone-based matrices, may be produced by a silica-precipitation process which does not require the resulting precipitated silica to be subsequently treated.

More precisely, the work of the inventors has highlighted that it is possible to produce precipitated silicas displaying good dispersibility within a silicone-based matrix, and characterized by water-uptakes of less than 6%, provided that the precipitation reaction of the silica takes place under controlled conditions, especially by carrying out the precipitation reaction in a diluted medium, and by maintaining the pH of the reaction medium at a value of about 7.5, during the formation of the silica.

The results obtained by the inventors, with regard to the water-uptake values, are particularly surprising. As a matter of fact, the most advantageous silicas currently obtained by the precipitation processes of the prior art have at least water-uptake values of between 6.5 and 7%.

On the basis of this discovery, one of the aim of the present invention is to provide a novel process for preparing precipitated silica, which is easy to use, economical, and which allows to obtain silicas displaying both good dispersibility features, especially within silicone-based matrices, and a very low affinity for water.

More specifically, a further aim of the invention is to provide precipitated silicas that may be used as reinforcing agents in silicone-based polymer matrices, and in particular in silicone-based elastomer matrices that are intended to insure the function of an insulant, for example in the coating of electrical wires.

Thus, according to a first aspect, the present invention relates to a process for preparing a low water-uptake precipitated silica, comprising the following successive steps consisting in:

(a) producing an initial feedstock comprising a silicate, the silicate concentration in said feedstock, expressed in $SiO_2$ equivalent, being less than 15 g/l;

(b) by adding an acidifying agent, bringing the pH of the medium to a value of between 7 and 8, preferably to a value of between 7.2 and 7.8, and advantageously between 7.3 and 7.7 (typically, to a value substantially equal to 7.5);

(c) in the resulting medium, simultaneously adding a silicate and an acidifying agent, the respective amounts of added silicate and acidifying agent over time being specifically selected such that, throughout the addition:

the pH of the reaction medium remains between 7 and 8, and advantageously between 7.2 and 7.8; and the silicon concentration in the medium, expressed in $SiO_2$ equivalent, remains less than or equal to 35 g/l;

(d) adding an acidifying agent to the medium resulting from step (c), so as to bring the medium at a pH value of between 3 and 6.5; and (e) filtering the resulting aqueous silica dispersion and drying the filter cake obtained at the end of the filtering step, preferably washing it beforehand, whereby said low water-uptake precipitated silica is obtained, in solid form.

The silicates used in steps (a) and (c) of the process of the invention may be selected from all common forms of silicates, and, especially, from the metasilicates or disilicates. Advantageously, the silicates used according to the invention are alkali silicates, such as sodium or potassium silicates, for example.

In a particularly preferred manner, the silicate from step (a) is a sodium silicate, as is that added during step (c). The sodium silicate used is, in this case, generally characterized by an $SiO_2/Na_2O$ weight ratio of between 2 and 4, advantageously between 3 and 3.6, this $SiO_2/Na_2O$ weight ratio preferably being between 3.3 and 3.5 (typically, this ratio is substantially equal to 3.4).

The initial feedstock of step (a) of the process of the invention is usually in the form of an aqueous silicate solution, the concentration of which is, characteristically, less than or equal to 15 g/l. Typically, the silicate concentration in the feedstock of step (a), expressed in $SiO_2$ equivalent, is between 1 g/l and 15 g/l. This silicate concentration in the feedstock of step (a), expressed in $SiO_2$ equivalent, is advantageously less than or equal to 10 g/l, and preferably less than or equal to 9 g/l.

The feedstock of step (a) generally has a pH of about 9 to 13. Step (b) of the process of the invention consists specifically in reducing this pH value, by adding an acidifying agent, so as to bring the pH of the medium into the range from 7 to 8, the inventors having demonstrated that the silica precipitation reaction takes place optimally in this range.

The term 'acidifying agent', in the sense of the invention, mean any inorganic or organic acid compound that is liable to reduce the pH of the feedstock. An inorganic acid, such as sulfuric acid, hydrochloric acid or nitric acid, or alternatively an organic acid, such as acetic acid, formic acid or carbonic acid, may thus advantageously be used as an acidifying agent.

Advantageously, no electrolytes are added during the preparation process according to the invention, especially in step (a). The term 'electrolyte' is used here in its conventional sense, i.e. this term refers to any ionic or molecular substance which, when it is in solution, breaks down or splits up to form ions or charged particles. An example of an electrolyte is a salt from the group of the alkali and alkaline earth metals salts, e.g. the salt of the starting silicate metal and the acidifying agent, for example sodium chloride, in the case of the reaction of a sodium silicate with hydrochloric acid, or, preferably, sodium sulfate, in the case of the reaction of a sodium silicate with sulfuric acid.

The acidifying agent used in step (b) of the process of the invention is preferably sulfuric acid, in particular if the silicate located in the initial feedstock is an alkali silicate. Generally, the acidifying agent of step (b) is usually introduced in the form of an aqueous solution, preferably diluted, generally having a normality of between 0.25 N and 8 N. Thus, in step (b), the pH of the medium may advantageously be reduced by adding a sulfuric acid aqueous solution having a concentration of between 10 g/l and 350 g/l, and preferably between 50 g/l and 250 g/l.

Whatever the precise nature of the acidifying agent of step (b), it must be used such that its addition causes the pH of the medium to be reduced to a value of between 7 and 8. The amount of acidifying agent that is to be used is generally determined, in practice, by measuring the development of the pH during the addition, the addition of the acidifying agent from step (b) continuing until the pH reaches the desired value.

Advantageously, in the process of the invention, the pH is reduced in step (b) by adding the acidifying agent to the feedstock, which is beforehand brought to a temperature of between 50 and 100° C., and preferably to a temperature higher than or equal to 90° C.

Besides, the addition from step (b) is preferably carried out gradually, i.e. advantageously, as a general rule, over an addition period of between 3 and 60 minutes, usually at least equal to 5 minutes, and preferably at least equal to 10 minutes. This addition period is however advantageously less than 30 minutes.

According to a specific embodiment of step (b) which may be contemplated, this step may include a maturation process, which, optionally, takes place by leaving the medium to develop over a period generally of between 5 and 30 minutes, preferably at a temperature of between 90 and 100° C., it being understood that, after this maturation, the reaction medium pH is if necessary adjusted, in particular by adding an acidifying agent, such that, at the end of step (b), the pH of the medium is located in the pH range between 7 and 8, and advantageously in the aforementioned preferential ranges.

Following step (b), through which the pH of the reaction medium is brought to the preferential zone of 7 to 8, and preferably to approx. 7.5, step (c) of the process of the invention consists in continuing the silica precipitation process, by introducing additional silicate, and specifically by maintaining the pH of the medium in the zone between 7 and 8, preferably at a substantially constant value, this constant value being, in this case, preferably close to 7.5, i.e. generally between 7.3 and 7.7.

To this end, the silicate from step (c) is introduced together with an acidifying agent, which counteracts the increase in pH that would be noted if the silicate alone were added. Preferably, step (c) of the process of the invention is carried out immediately after obtaining the desired pH of the medium in step (b).

The 'simultaneous addition' of the silicate and the acidifying agent, which takes place during step (c), advantageously consists in continuously adding silicate to the medium, whilst measuring the pH of the medium and adjusting the value of this pH by introducing the acidifying agent, it being possible to introduce the acidifying agent, for example, once the pH of the medium has exceeded a test value of between 7 and 8, this test value generally being fixed at approx. 7.5. In this way, a substantially constant pH value, i.e. varying, advantageously, by +/−0.2 pH units (preferably by +/−0.1 pH unit) around a fixed value, generally between 7.3 and 7.7, is maintained in the medium.

Alternatively, the simultaneous addition from step (c) may also consist in continuously adding acidifying agent to the medium, the pH, in this case, being adjusted during the addition by introducing the silicate, it being possible, here too, to introduce the silicate, for example, once the pH of the medium has dropped below a control value of between 7 and 8, usually fixed at about 7.5. By this way, a substantially constant pH is maintained in the medium, i.e. a pH varying, advantageously, by +/−0.2 pH unit (preferably by +/−0.1 pH unit) around a fixed value, said value being generally between 7.3 and 7.7.

According to another conceivable embodiment, the simultaneous addition of step (c) may also consist in continuously adding both acidifying agent and silicate, with concentrations and flow rates calculated such that, throughout the addition, the pH of the medium remains between 7 and 8, and preferably between 7.2 and 7.8. In this case, the pH of the medium generally tends to develop during step (c), whilst remaining within the aforementioned range, but it may, in certain cases, remain substantially equal to a constant value, advantageously at approx. 7.5. It is generally preferred if, throughout step (c), the instantaneous flow rates correspond to the amount of silicate functions (expressed in molar equivalent of NaOH) introduced per second (marked $d_S$), and the amount of acid functions (in moles) introduced per second (marked $d_A$), and are such that the $d_S/d_A$ ratio permanently remains between 1.01 and 1.09, and preferably between 1.02 and 1.07.

Whatever the precise method of carrying out step (c), the silicate and the acidifying agent used are usually identical to those used in steps (a) and (b). The silicate from step (c) is thus preferably an alkali silicate, advantageously a sodium silicate, and the acidifying agent is preferably a strong inorganic acid, usually sulfuric acid.

Insofar as the silicon concentration in the medium (expressed in $SiO_2$ equivalent) must, characteristically, be kept less than or equal to 35 g/l during the simultaneous addition from step (c), the silicate that is introduced into the reaction medium during step (c) is generally in the form of a diluted aqueous solution, i.e. a solution having a concentration, expressed in $SiO_2$ equivalent, advantageously of between 10 g/l and 360 g/l, preferably less than 300 g/l, and advantageously less than 270 g/l; this is particularly the case when alkali silicates, such as sodium silicates, are used. Similarly, the acidifying agent is usually in the form of a dilute aqueous solution, which generally has a normality of between 0.25 N and 8 N, and preferably between 0.5 N and 4 N. Thus, in the particular case in which the acidifying agent from step (c) that is used is an aqueous sulfuric acid solution, for example, the concentration of the solution is advantageously between 25 g/l and 380 g/l, and preferably between 50 g/l and 300 g/l.

It should be emphasized that, given that dilute concentrations are used in the medium for the precipitation of the silicas by the process according to the invention, the salt concentrations in this medium, which are linked, in particular, to the reaction of the silicate and the acidifying agent, are characteristically extremely low, and this results in a low ionic strength within the precipitation medium used.

Without wanting to be tied in any way to a particular theory, it seems plausible to suggest that by checking the pH and the concentrations that are used according to the invention, the formation of SiOH surface groups, large numbers of which generally form in the processes of the prior art that do not implement such a check, may be minimized. The invention thus allows precipitated silicas having extremely low water-uptakes to be obtained.

In order to monitor the formation of the silica even more effectively, the inventors demonstrated that it was particularly advantageous to carry out the simultaneous addition from step (c) with relatively low silicate and acidifying agent flow rates, i.e., usually, over a step (c) addition period preferably of between 15 and 300 minutes, and more preferably of between 30 and 100 minutes. Addition periods of this type generally yield silica particles having extremely low Si—OH surface group contents.

Generally, step (c) of the process of the invention is advantageously carried out while stirring, and preferably at a temperature of between 50 and 100° C., and generally at the same temperature as the addition from step (b). The temperature at which step (c) is implemented may thus advantageously be between 90 and 100° C., and it is preferably approx. 95° C.

According to a particular variant of the process of the invention, an aluminum-based compound, preferably a salt that is acidic in nature, such as an aluminum sulfate, or, alternatively, a compound that is basic in nature, such as a sodium aluminate, may be introduced into the reaction medium during step (c), preferably at the end of this step (i.e., typically, during the period corresponding to the last quarter of this step, and generally during the last 5 to 15 minutes of this step). The addition of this aluminum-based compound may, inter alia, result in an improvement in the water-uptake characteristics of the resulting silica, and, in the particular case in which sulfuric acid is used as an acidifying agent, it allows the sulfate content in the silica obtained at the end of the process of the invention to be reduced. The amount of aluminum compound introduced is generally such that, within the reaction medium, the $Ai/SiO_2$ ratio is between 0.1 and 1% by mass, this ratio preferably being at most equal to 0.6%, and preferably less than or equal to 0.5%.

Whatever the precise embodiment of step (c), the pH of the reaction medium at the end of this step is specifically between 7 and 8, and preferably of about 7.5.

Step (d), in which the medium is acidified to the pH zone of 3 to 6.5 may be modified, in terms of the amount of acidifying agent that is added, as a function of the applications that are envisaged for the silica prepared by the process of the invention. Preferably, the medium has reached a pH of between 3.5 and 5.5 by the end of step (d).

It does not matter whether the acidifying agent from step (d) is identical to or different from that or those used in steps (b) and (c). Preferably, this acidifying agent from step (d) is introduced to the medium in the form of an aqueous solution having a normality of between 0.25 N and 8 N. Advantageously, it is an aqueous sulfuric acid solution, generally having a concentration of between 25 and 380 g/l, as appropriate.

The temperature at which the optional step (d) is carried out is usually between 50 and 100° C., and it may thus be identical to that used during the preceding step (c).

Generally, it is also preferred if all of steps (a), (b), (c) and (d) of the process are carried out at a temperature of between 90 and 100° C., and advantageously at a temperature of between 93 and 97° C., and even more advantageously at a temperature substantially equal to 95° C., throughout the process.

According to an advantageous embodiment of the process of the invention, the silica aqueous dispersions resulting from steps (c) and (d) may be subjected to a maturation step, generally carried out, if appropriate, by leaving the medium at a temperature of between 90 and 100° C., preferably while stirring, for a period that may advantageously be between 15 minutes and 240 minutes, and preferably over a period longer than 30 minutes, the temperature during the maturation preferably being substantially constant (if appropriate, advantageously substantially equal to 95° C.), or else rising (generally in one or more stages, if appropriate) within the temperature range of 90 to 100° C.

It should be emphasized that an aluminum compound, especially of the aluminum sulfate type, which may be added at the end of step (c), may also be added during step (d), or else during the subsequent maturation step, when this step is implemented. The aluminum-based compound may thus generally be added to the medium between step (c) and step (e).

Step (e) of the process of the invention consists, overall, in recovering a silica in solid form from the dispersion resulting from the preceding steps.

In this step (e), the dispersion resulting from step (d) and the optionally subsequent maturation step is usually subjected to filtration on a filter press, or to vacuum filtration using a rotary filter, a belt filter, or alternatively a flat filter, this filtration yielding a "silica cake", i.e. a silica pulp having a relatively high water content. The resulting silica cake is then usually subjected to a washing step, generally using water, so as to reduce its salt content, and it is then subjected to drying, in particular using a suitable form of spraying, and for example using a turbine spray dispenser, a nozzle spray dispenser, a liquid-pressure spray dispenser, or a two-fluid spray dispenser.

The silica cake is generally split beforehand, so as to form a silica pulp that is of sufficiently low viscosity to allow it to be pumped to the spray dispenser. This pulp preferably displays a melting loss, at 1,000° C., that is less than or equal to 82% by mass.

The splitting process may optionally be carried out, for example, by placing the filter cake in a grinding mill of the colloid mill or ball mill type, or else by disintegrating it using ultrasound. In particular, if the silica cake is obtained by filtration on a filter press, it is advantageous to use a stirring process with a high shearing force, for example of the contra-rotating type, during the splitting step. An aluminum-based compound may conceivably be added in order to facilitate the splitting procedure.

The low-viscosity pulp resulting from splitting of this type is usually in the form of an aqueous silica dispersion, which is pumped directly toward a spray dispenser for step (e). However, step (e) may also conceivably be carried out subsequently, in particular on a different active site. The low-viscosity pulp obtained following splitting is, in most cases, an aqueous silica composition, which is easily transportable and storable, and which may at any time, under the influence of sufficient mechanical stress, be put in the form of a silica dispersion having a sufficiently fluid viscosity to be pumped, then dried by spraying. The present invention relates, in particular, to this specific aqueous silica composition.

The precipitated silica obtained by the process of the invention may be in the form of substantially spherical pellets, having an average diameter preferably of between 80 and 350 µm, advantageously of between 150 and 280 µm, in particular if it is obtained by drying a split filter cake having a melting loss of less than 82%. This average size of the pellets is determined, in accordance with Standard NF X 11507 (December 1970), by dry sifting and by determining the diameter corresponding to an accumulated residue at 50%. The filling density, in the packed state (DRT) of this type of pellet, measured in accordance with Standard NF T 30 042, is, in general, at least 0.2, and it is typically between 0.25 and 0.3. Moreover, these pellets usually have a total pore volume of at least 3 $cm^3/g$, advantageously between 3.5 and 4.5 $cm^3/g$, this pore volume being measured using a mercury porosimeter (the tested samples being dried for 2 hours at 200° C. in an incubator, then immediately degassed under vacuum, in the 5 minutes after they leave the incubator), and the pore diameters being calculated using the WASHBURN ratio, with a contact angle theta equal to 140° C., and a surface tension gamma equal to 484 dynes/cm (MICROMERITICS 9300 porosimeter).

This type of pellet may be subjected to subsequent grinding, so as to obtain the precipitated silica in the form of a powder, within which the particles may have an average size of between 3 and 15 microns, depending on the intensity of the grinding.

More generally, depending on the type of drying that is carried out, the precipitated silicas resulting from step (e) may be in the form of isotropic or anisotropic particle powders, having average dimensions that may, as a general rule, be between 3 and 350 microns. The filling density in the packed state (DRT) of these powders measured in accordance with Standard NF T 30 042, is generally between 0.1 and 0.3. Moreover, these powders usually have a total pore volume, as defined above for the pellets, that is advantageously between 3 and 6 $cm^3/g$.

In the preparation of a silica that is specifically intended for use in reinforcing silicone-based matrices, the silica that is produced is preferably in the form of particles having an average size of between 3 and 30 microns, and preferably between 5 and 15 microns. In order to obtain grain sizes of this type, any kind of silica obtained by the process of the invention may be used, and subjected to an optional grinding step; the different sized grains found within the resulting silica may then, if necessary, be separated, using vibrating strainers having suitable mesh sizes, for example, it being possible to recover the particles that are too large and return them to the grinding.

The dried silicas resulting from step (e) may also be subjected to an agglomeration step, in particular by direct compression, by wet granulation (i.e. using a binder, such as water), by extrusion and, preferably, by dry compaction. If this last technique is used, it may prove advantageous, before starting compaction, to deaerate (a process also known as pre-densification or degassing) the pulverulent products, so as to eliminate the air contained therein and provide more even compaction. At the end of the agglomeration step, the products may be graded to a desired size, for example by sifting, then conditioned for subsequent use. The compacted, precipitated silica that may be obtained according to this particular embodiment of the invention, is advantageously in the form of granules. These granules may optionally be of the most diverse shapes. Examples include spherical, cylindrical, parallelepiped, lozenge, tablet and pellet shapes, and extruded shapes with a circular or polylobe-shaped cross-section. The average dimensions of these granules are preferably between 2 mm and 20 mm. Moreover, the filling density, in the packed state of said granules, measured in accordance with Standard NF T 30 042, is in general at least 0.15, and may go up to 0.35, and these granules generally have a total pore volume of between 2.5 and 4.5 $cm^3/g$.

Whatever their shape, the precipitated silicas resulting from the process of the invention generally have a very low water-uptake, in the sense of the invention, in conjunction, in particular, with a large specific surface area and a low density, which gives them high dispersibility, in particular within silicone-based elastomer matrices, and this makes them particularly suitable for use as a reinforcing filler in a silicone-based matrix.

Thus, the process of the invention usually leads to precipitated silicas having a water-uptake of less than 6%. It should be recalled that the water-uptake referred to here is water-uptake in the sense of the invention, measured in accordance with the drying/hydration test defined above. In most cases, the water-uptake of the silicas obtained by the process of the invention is less than or equal to 5.9%, and generally less than 5.8%. The water-uptake of the silicas obtained by the process of the invention may thus particularly advantageously be less than or equal to 5.7%, and even less than or equal to 5.5%. Advantageously, it is less than or equal to 5.4%, or even less than or equal to 5.3%. In the most general cases, it is, nevertheless, usually greater than 4%, and generally greater than 4.5%.

In addition to this low water-uptake, the silicas obtained by the process of the invention are generally such that, after heat treatment at 105° C. for 8 hours, they have a residual water content that is generally between 2 and 4% by mass, based on the total mass of the sample, preferably less than 3% by mass, based on the total mass of the sample, and advantageously less than 2.7% by mass, based on the total mass of the sample.

Moreover, the precipitated silicas obtained by the process of the invention generally have a BET specific surface area, as measured using the BRUNAUER-EMMET-TELLER process described in the *Journal of the American Chemical Society*, vol. 60, p. 309 (February 1938), greater than 100 $m^2/g$, and preferably at least equal to 120 $m^2/g$. This BET specific surface area is advantageously at least equal to 150 $m^2/g$, but it generally remains less than or equal to 200 $m^2/g$. It is thus typically between 120 and 185 $m^2/g$.

The silicas obtained by the process of the invention may also be characterized by what is known as a CTAB specific surface area, determined by adsorption of cetyl trimethyl ammonium bromide (pH=9), in accordance with Standard NFT 45007 (November 1987). Generally, the CTAB specific surface area of the silicas obtained by the process of the invention is between 100 and 200 $m^2/g$, and it is advantageously at least equal to 110 $m^2/g$, and preferably at least equal to 130 $m^2/g$. It may thus typically be between 120 and 185 $m^2/g$.

Moreover, the silicas obtained by the process of the invention are generally characterized by a DOP oil intake, determined in accordance with Standard NF T 30-022 (March 1953), using dioctylphthalate, of between 150 ml/100 g and 300 ml/100 g, and preferably greater than 200 ml/100 g.

The precipitated silicas resulting from the process of the invention generally contain, at least in the trace state, a salt produced by the action of the acidifying agents used on the silicates used. Thus, if the process of the invention specifically uses an alkali silicate as a precursor of the silica, and sulfuric acid as an acidifying agent, the precipitated silicas contain an alkali sulfate. Generally, the alkali sulfate content in the resulting silicas is relatively low, usually such that the mass of the sulfate ions present generally represents at most 0.5% by mass, based on the total mass of the dry matter (typically between 0.1 and 0.5% by mass, based on the total mass of the dry matter). This sulfate ion content may also be reduced by carrying out filtration following the pressurized washing of the silica cake during step (e) of the process. In this case, the mass of the sulfate ions present generally represents between 0.05 and 0.4% by mass, based on the total mass of the dry matter, and it is advantageously less than 0.3%, preferably less than 0.2%, and even more advantageously less than 0.1% by mass, based on the total mass of the dry matter.

If a sodium silicate is used as a precursor of the silica in the process of the invention, the silica resulting from the process specifically contains sodium ions, whatever type of acidifying agents are used. Generally, the residual sodium content within the resulting silicas is between 300 and 1,500 ppm, this content possibly being less than or equal to 1,000 ppm, and advantageously less than or equal to 800 ppm. This sodium content is measured by flame spectral emission of a sample of the silica having a determined mass, dissolved in hydrofluoric acid.

Moreover, the silicas of the invention are characterized by a pH, measured in accordance with Standard ISO 787/9 (pH of a suspension, at 5% by mass, of the silica in the water), generally of between 4.5 and 7, and preferably between 4.8 and 6.

The precipitated silicas obtained by the process of the invention display a very good aptitude for dispersion, and they are particularly suitable for use as a reinforcing filler in silicone-based matrices, which they provide with very good rheological properties, whilst at the same time furnishing them with very satisfactory mechanical properties. The present invention also relates, in particular, to the use of the silicas resulting from the process of the invention.

The silicas prepared by the process according to the invention thus find a particularly advantageous application in reinforcing silicone-based elastomer matrices, such as, for example, elastomer matrices that may be vulcanized cold or hot.

The silicas obtained by the process of the invention are especially suitable for use as a filler for organosilicon compositions.

The type of organosilicon compositions that may be reinforced by the silicas obtained by the process of the invention is not essential. Generally, these organosilicon compositions may be of elastomer or paste types.

In the case of elastomer compositions, a vulcanizable organosilicon polymer is generally used such that the ratio between the total number of radicals R and the total number of silicon atoms is between 0.5 and 3, wherein R denotes the hydrocarbon-type radicals bound to the silicon atoms. In the composition of the organosilicon polymer, the other available valencies of the silicon are bound to heteroatoms such as oxygen or nitrogen, or else to multivalent hydrocarbon radicals.

Preferably, the organiosilicic compositions filled by the silicas obtained by the process of the invention are organopolysiloxane compositions, in which the organopolysiloxane may be linear or branched, and may optionally also comprise hydrocarbon radicals of the reactive groups, such as, for example, hydroxyl groups, hydrolysable groups, alkenyl groups or hydrogen atoms.

More precisely, the main constituent organopolysiloxanes of these compositions comprise siloxane units having the general formula:

optionally associated with siloxane units having the formula:

In these formulae, the various symbols have the following meaning:

R represents a non-hydrolysable hydrocarbon-type group, wherein this radical may be:
- an alkyl or halogenoalkyl radical having 1 to 5 carbon atoms and comprising 1 to 6 chlorine and/or fluorine atoms;
- cycloalkyl or halogenocycloalkyl radicals having 3 to 8 carbon atoms and containing 1 to 4 chlorine and/ fluorine atoms;
- aryl and halogenoaryl radicals having 6 to 8 carbon atoms and containing 1 to 4 chlorine and/or fluorine atoms;
- cyanoalkyl radicals having 3 to 4 carbonate atoms.

Z represents a hydrogen atom, an alkenyl group, a hydroxyl group, a hydrolysable atom, and a hydrolysable group.

n represents an integer equal to 0, 1, 2 or 3;

x represents an integer equal to 0, 1, 2 or 3;

y represents an integer less than or equal to 2.

Examples of organic radicals R directly bound to silicon atoms include the following groups: methyl; ethyl; propyl; isopropyl; butyl; isobutyl; α-pentyl; t-butyl; chloromethyl; dichloromethyl; α-chloroethyl; α,β-dichloroethyl; fluoromethyl; difluoromethyl; α,β-difluoroethyl; trifluoro-3,3,3-proyl; trifluorocyclopropyl; cyclopropyl; trifluoro-4,4,4-butyl; heptafluoro-3,3,4,4,5,5-pentyl; β-cyanoethyl; γ-cyanopropyl; phenyl; p-chlorophenyl; m-chlorophenyl; dichloro-3,5-phenyl; trichlorophenyl; tetrachlorophenyl; o-, p- or m-totyl; α,α,α-trifluorototyl; xylyls such as dimethyl-2,3-phenyl; dimethyl-3,4-phenyl.

Preferably, the organic radicals bound to the silicon atoms are methyl, phenyl or vinyl radicals, wherein these radicals may optionally be halogenated, or alternatively cyanoalkyl radicals.

The Z symbols advantageously represent hydrogen or chlorine atoms, vinyl groups, hydroxyl groups or hydrolysable groups, such as amino, amido, aminoxy, oxime, alkoxy, alkoxyalkoxy, alkenyloxy acyloxy radicals.

The type of organopolysiloxane, and therefore the ratios between the siloxane units (I) and (II), and the distribution of said units, is generally selected as a function of the intended application, and as a function of the vulcanization treatment that will be carried out on the composition.

They may therefore be compositions that may be vulcanized at an elevated temperature under the action of organic peroxides, such as cichloro-2,4-benzoyl peroxide, benzoyl peroxide, t-butyl perbenzoate, cumyl peroxide, and di-t-butyl peroxide.

The organopolysiloxane entering compositions of this type thus basically comprises siloxane units (I), and does not contain any hydrolysable groups or atoms.

Polymethyl polysiloxanes completed by trimethylsilyl groups represent a particularly important example of this category in industry.

Vulcanization may also be carried out at ambient temperature or at a moderate temperature, by creating cross-links between vinylsilyl groups and hydrogenosilyl groups, the hydrosilylation reaction being carried out in the presence of catalysts, such as platinum derivatives. The organopolysiloxanes used do not then contain hydrolysable atoms or groups.

Vulcanization may be carried out under the action of moisture. The organopolysiloxanes contained in the compositions of this type contain hydrolysable atoms or groups, such as those defined above. The siloxane units (II) containing groups of this type represent at most 15% by weight of the total mass of the organopolysiloxane used. The organopolysiloxane compositions of this type generally contain catalysts, such as tin salt.

Vulcanization may lastly be carried out in the presence of crosslinking agents. The organopolysiloxanes entering these compositions are, in general, linear, branched or crosslinked polysiloxanes comprising units (I) and (II), wherein Z is a hydroxyl group and x is at least equal to 1. The crosslinking agent may be a polyfunctional silane, such as methyltriacetoxysilane, isopropyltriacetoxysilane, vinyltriacetoxysilane, or methyltris(diethylaminoxy)silane. Various other compounds, such as silicates, may be used as crosslinking agents.

The organosilicon compositions according to the invention contain 5 to 50%, and preferably 10 to 40% optionally treated precipitated silicas, as defined above. In the case of silicone pastes, the proportion of silica of the invention will generally be between 3 and 20%.

In addition to the polysiloxanes, the optionally treated precipitated silica, the crosslinking agents and the crosslinking catalysts, moreover, the compositions may contain conventional fillers, such as quartz powder, diatomaceous earth, talc, carbon black, or carbonate. The compositions may also contain various conventional adjuvants, such as anti-structure agents, heat stabilizers, thixotropic agents, pigments, and corrosion inhibitors.

Anti-structure agents, also known as plasticisers, are generally organosilicon in nature, and are introduced in a proportion of 0 to 20 parts per 100 parts of organosilicon gum. They prevent the compositions from hardening during storage. Examples of anti-structure agents include silanes with hydrolysable groups, or hydroxylated or alkoxylated diorganopolysiloxane oils having a low molecular weight. Compositions of this type are described, for example, in French patent FR-A-1,111,969.

Examples of heat stabilizers that are well-known to a person skilled in the art include the salts, oxides and hydroxides of iron, cerium or manganese. These additives, which may be used individually or in a mixture, are generally introduced in a proportion of 0.01 to 5%, based on the weight of the organopolysiloxane gum used.

The organopolysiloxane compositions are prepared by mixing the various components of the composition, as described above. Mixing may be carried out at ambient temperature or in heat.

The silicone-based matrices may be shaped by extrusion before being crosslinked. The silicas obtained according to the invention have proven to be particularly useful as reinforcing fillers in this silicone-based matrix shaped by extrusion, their low water content limiting the formation of bubbles.

In addition to their applications as fillers in silicone-based matrices, the low water-uptake silicas of the present invention may also advantageously be used as reinforcing fillers in organic polymer-based matrices, and in particular in matrices based on one or more elastomers, which may be natural or synthetic, and especially in rubber-based matrices, and more particularly matrices based on natural or synthetic rubbers, of the SBR or butyl rubber type in particular. The silicas obtained by the process of the invention display good dispersibility and reinforcing qualities within polymer and elastomer matrices, where they may, in particular, increase resistance to abrasion, and this can prove advantageous in the composition of pneumatics.

In the context of elastomer matrix reinforcement, the inventors have also demonstrated that the silicas obtained by the process of the present invention are particularly suitable for reinforcing transparent or translucent matrices, such as those used, in particular, for making transparent or translucent rubber shoe parts (soles, for example), where they have much less effect on the characteristics of transparency or translucency than most other currently known silicas used in this context.

The low water-uptake silicas of the present invention may also advantageously be used as thickening agents within organic or aqueous media, preferably within aqueous media, and in particular within toothpastes.

Moreover, the silicas obtained according to the invention may also prove useful in numerous other conventional fields of use of precipitated silicas, for example for producing paints or papers. They have proven to be particularly advantageous as a support in food or cosmetic compositions.

Because of their low salt content, the silicas obtained by the process of the present invention are also particularly suitable in the field of galenical pharmacology. The silicas of the present invention are thus particularly suitable as fillers, supports and/or excipients within pharmaceutical compositions. The present invention also relates, in particular, to the use of the silicas of the invention in this context, and to the pharmaceutical compositions thereby obtained.

The subject and the advantages of the present invention will become even more apparent from the various practical examples set out below.

EXAMPLE 1

14,000 g of water and 630 g of an aqueous sodium silicate solution at 236 g/l in $SiO_2$ equivalent, were introduced into a reactor equipped with a system for controlling temperature and pH, and a stirring system with a three-blade propeller, the $SiO_2/NA_2O$ weight ratio (wr) of the sodium silicate used being 3.46.

After initiating the stirring (250 rpm), the feedstock thus formed was heated to 95° C., and the pH brought to 7.5, in 11 minutes, by adding an aqueous solution of sulfuric acid at 80 g/l (average flow rate of 61 g per minute).

Once the pH of 7.5 had been reached, 4,320 g of an aqueous sodium silicate solution (wr=3.46), at 236 g/l in $SiO_2$ equivalent, were continuously added at a constant flow rate of 48 grams per minutes (duration of addition: 90 minutes), the pH of the medium being kept at a value equal to 7.5 (to within 0.1 pH unit), by adding an aqueous sulfuric acid solution at 80 g/l to the medium, with a flow rate monitored as a function of the development measured in the pH of the medium. In total, 4,770 g of the sulfuric acid solution were added to the medium, which corresponds to an average flow rate of 53 grams of sulfuric acid solution added per minute.

After 90 minutes of addition, no more silicate was added, and acid was added until the pH of the reaction medium had stabilized at 3.4. The solution was then left to mature for 5 minutes while stirring.

The resulting pulp was then filtered on a flat filter, and the resulting cake was mechanically split at a pH equal to 5, then dried by spraying.

The resulting dried silica displayed the following physico-chemical characteristics:

| | |
|---|---|
| pH of powder: | 5.5 |
| $NaSO_4$ content: | 0.2% by mass (based on the total mass of the matter in the dry state) |
| CTAB specific surface area: | 160 m$^2$/g |
| BET specific surface area: | 160 m$^2$/g |
| Melting loss at 1,000° C.: | 4.9% |
| Residual water content after a 2 hour treatment at 1,000° C.: | 2.6% |
| Water-uptake (in accordance with the definition of the invention): | 5.5% |

EXAMPLE 2

14,000 g of water and 450 g of an aqueous sodium silicate solution at 236 g/l in $SiO_2$ equivalent, were introduced into a reactor equipped with a system for controlling temperature and pH, and a stirring system with a three-blade propeller, the $SiO_2/NA_2O$ weight ratio (wr) of the sodium silicate used being 3.46.

After initiating the stirring (250 rpm), the feedstock thus formed was heated to 98° C., and the pH brought to 7.5, in 11 minutes, by adding an aqueous solution of sulfuric acid at 80 g/l (average flow rate of 61 g per minute).

Once the pH of 7.5 had been reached, 3,150 g of an aqueous sodium silicate solution (wr=3.46), at 236 g/l in $SiO_2$ equivalent, were continuously added at a constant flow rate of 35 grams per minutes (duration of addition: 90 minutes), the pH of the medium being kept at a value equal to 7.5 (to within 0.1 pH unit), by adding an aqueous sulfuric acid solution at 80 g/l to the medium, with a flow rate monitored as a function of the development measured in the pH of the medium. In total, 3,510 g of the sulfuric acid solution were added to the medium, which corresponds to an average flow rate of 39 grams of sulfuric acid solution added per minute.

After 90 minutes of addition, no more silicate was added, and acid was added until the pH of the reaction medium had stabilized at 3.4. The solution was then left to mature for 5 minutes while stirring.

The resulting pulp was then filtered on a flat filter, and the resulting cake was mechanically split at a pH equal to 5, then dried by spraying.

The resulting dried silica displayed the following physico-chemical characteristics:

| | |
|---|---|
| pH of powder: | 5.2 |
| $NaSO_4$ content: | 0.3% by mass (based on the total mass of the matter in the dry state) |

-continued

| | |
|---|---|
| CTAB specific surface area: | 164 m²/g |
| BET specific surface area: | 165 m²/g |
| Melting loss at 1,000° C.: | 4.8% |
| Residual water content after a 2 hour treatment at 1,000° C.: | 2.6% |
| Water-uptake (in accordance with the definition of the invention): | 5.5% |

EXAMPLE 3

11,000 g of water and 630 g of an aqueous sodium silicate solution at 236 g/l in $SiO_2$ equivalent, were introduced into a reactor equipped with a system for controlling temperature and pH, and a stirring system with a three-blade propeller, the $SiO_2/NA_2O$ weight ratio (wr) of the sodium silicate used being 3.46.

After initiating the stirring (250 rpm), the feedstock thus formed was heated to 95° C., and the pH brought to 7.5, in 11 minutes, by adding an aqueous solution of sulfuric acid at 80 g/l (average flow rate of 61 g per minute).

Once the pH of 7.5 had been reached, 4,320 g of an aqueous sodium silicate solution (wr=3.46), at 236 g/l in $SiO_2$ equivalent, were continuously added at a constant flow rate of 48 grams per minutes (duration of addition: 90 minutes), the pH of the medium being kept at a value equal to 7.5 (to within 0.1 pH unit), by adding an aqueous sulfuric acid solution at 80 g/l to the medium, with a flow rate monitored as a function of the development measured in the pH of the medium. In total, 4,770 g of the sulfuric acid solution were added to the medium, which corresponds to an average flow rate of 53 grams of sulfuric acid solution added per minute.

After 90 minutes of addition, no more silicate was added, and acid was added until the pH of the reaction medium had stabilized at 3.4. The solution was then left to mature for 5 minutes while stirring.

The resulting pulp was then filtered on a flat filter, and the resulting cake was mechanically split at a pH equal to 5, then dried by spraying.

The resulting dried silica displayed the following physico-chemical characteristics:

| | |
|---|---|
| pH of powder: | 5.4 |
| NaSO₄ content: | 0.2% by mass (based on the total mass of the matter in the dry state) |
| CTAB specific surface area: | 110 m²/g |
| BET specific surface area: | 126 m²/g |
| Melting loss at 1,000° C.: | 5.1% |
| Residual water content after a 2 hour treatment at 1,000° C.: | 2.7% |
| Water-uptake (in accordance with the definition of the invention): | 5.2% |

EXAMPLE 4

14,000 g of water and 450 g of an aqueous sodium silicate solution at 236 g/l in $SiO_2$ equivalent, were introduced into a reactor equipped with a system for controlling temperature and pH, and a stirring system with a three-blade propeller, the $SiO_2/NA_2O$ weight ratio (wr) of the sodium silicate used being 3.46.

After initiating the stirring (250 rpm), the feedstock thus formed was heated to 95° C., and the pH brought to 7.5, in 11 minutes, by adding an aqueous solution of sulfuric acid at 80 g/l (average flow rate of 61 g per minute).

Once the pH of 7.5 had been reached, 3,150 g of an aqueous sodium silicate solution (wr=3.46), at 236 g/l in $SiO_2$ equivalent, were continuously added at a constant flow rate of 35 grams per minutes (duration of addition: 90 minutes), the pH of the medium being kept at a value equal to 7.5 (to within 0.1 pH unit), by adding an aqueous sulfuric acid solution at 80 g/l to the medium, with a flow rate monitored as a function of the development measured in the pH of the medium. In total, 3,500 g of the sulfuric acid solution were added to the medium, which corresponds to an average flow rate of 40 grams of sulfuric acid solution added per minute.

After 90 minutes of addition, no more silicate was added, and acid was added until the pH of the reaction medium had stabilized at 3.4. The solution was then left to mature for 5 minutes while stirring.

The resulting pulp was then filtered on a flat filter, and the resulting cake was mechanically split at a pH equal to 5, then dried by spraying.

The resulting dried silica displayed the following physico-chemical characteristics:

| | |
|---|---|
| pH of powder: | 5.4 |
| NaSO₄ content: | 0.2% by mass (based on the total mass of the matter in the dry state) |
| CTAB specific surface area: | 121 m²/g |
| BET specific surface area: | 131 m²/g |
| Melting loss at 1,000° C.: | 5.4% |
| Residual water content after a 2 hour treatment at 1,000° C.: | 2.7% |
| Water-uptake (in accordance with the definition of the invention): | 5.2% |

EXAMPLE 5

950 liters of water and 33 liters of an aqueous sodium silicate solution at 236 g/l in $SiO_2$ equivalent, were introduced into a reactor equipped with a system for controlling temperature and pH, and a stirring system with a three-blade propeller, the $SiO_2/NA_2O$ weight ratio (wr) of the sodium silicate used being 3.46.

After initiating the stirring (250 rpm), the feedstock thus formed was heated to 95° C., and the pH brought to 7.5, in 11 minutes, by adding an aqueous solution of sulfuric acid at 80 g/l (average flow rate of 219 liters per hour).

Once the pH of 7.5 had been reached, 290 liters of an aqueous sodium silicate solution (wr=3.46), at 236 g/l in $SiO_2$ equivalent, were continuously added at a constant flow rate of 205 liters per hour (duration of addition: 85 minutes), the pH of the medium being kept at a value equal to 7.5 (to within 0.2 pH unit), by adding an aqueous sulfuric acid solution at 80 g/l to the medium, with a flow rate monitored as a function of the development measured in the pH of the medium. In total, 375 liters of the sulfuric acid solution were added to the medium, which corresponds to an average flow rate of 265 liters of sulfuric acid solution added per hour.

After 85 minutes of addition, no more silicate was added, and acid was added until the pH of the reaction medium had stabilized at 3.4. The solution was then left to mature for 5 minutes while stirring.

The resulting pulp was then filtered on a flat filter, and the resulting cake was mechanically split at a pH equal to 5, then dried by spraying (nozzle spray device).

The resulting dried silica displayed the following physico-chemical characteristics:

| | |
|---|---|
| pH of powder: | 5.1 |
| NaSO$_4$ content: | 0.28% by mass (based on the total mass of the matter in the dry state) |
| CTAB specific surface area: | 157 m$^2$/g |
| BET specific surface area: | 165 m$^2$/g |
| Melting loss at 1,000° C.: | 5.4% |
| Residual water content after a 2 hour treatment at 1,000° C.: | 3.1% |
| Water-uptake (in accordance with the definition of the invention): | 5.7% |

The invention claimed is:

1. A process for preparing a low water-uptake precipitated silica, comprising the following successive steps:
   (a) producing an initial feedstock comprising a silicate, the silicate concentration in the feedstock, expressed in SiO$_2$ equivalent, being less than 15 g/l;
   (b) adding an acidifying agent to form an acidified feedstock, bringing the pH of the medium to a value of between 7 and 8;
   (c) simultaneously adding a silicate and an acidifying agent to the feedstock resulting from step (b) to form a reaction medium, the respective amounts of added silicate and acidifying agent over time being specifically selected such that, throughout the entire addition:
   the pH of the reaction medium remains between 7 and 8;
   the silicon concentration in the reaction medium, expressed in SiO$_2$ equivalent, remains less than or equal to 35 g/l;
   (d) adding an acidifying agent to the reaction medium resulting from step (c), so as to bring the reaction medium to a pH of between 3 and 6.5; and
   (e) filtering the resulting aqueous silica dispersion, then drying the filter cake obtained at the end of the filtering step.

2. The process of claim 1, wherein the silicates used in steps (a) and (c) are alkali silicates.

3. The process of claim 1, wherein the acidifying agents used in steps (b), (c) and (d) comprise sulfuric acid, hydrochloric acid, nitric acid, acetic acid, formic acid and carbonic acid.

4. The process of claim 1, wherein the feedstock of step (a) is in the form of an aqueous silicate solution, having a concentration, expressed in SiO$_2$ equivalent, of less than or equal to 10 g/l.

5. The process of claim 1, wherein the acidifying agent of step (b) is introduced in the form of an aqueous solution having a normality of between 0.25 N and 8 N.

6. The process of claim 1, wherein the acidifying agent of step (b), is sulfuric acid, introduced in the form of an aqueous solution having a concentration of between 10 g/l and 350 g/l.

7. The process of claim 1, wherein the simultaneous addition of the silicate and acidifying agent of step (c) is carried out by continuously adding silicate to the reaction medium, the pH being adjusted during the addition by introducing acidifying agent if the pH of the medium becomes greater than a given control value, of between 7 and 8.

8. The process of claim 1, wherein the simultaneous addition of the silicate and acidifying agent of step (c) is carried out by continuously adding silicate to the medium, the pH being adjusted during the addition by introducing silicate if the pH of the medium becomes less than a test value of between 7 and 8.

9. The process of claim 1, wherein the simultaneous addition of the silicate and acidifying agent of step (c) comprises in continuously adding both acidifying agent and silicate, with concentrations and flow rates calculated such that, throughout the addition, the pH of the reaction medium remains between 7 and 8.

10. The process of claim 1, wherein the silicate that is introduced during the simultaneous addition of step (c) is in the form of an aqueous solution having a concentration of between 10 g/l and 360 g/l.

11. The process of claim 1, wherein the acidifying agent that is introduced during the simultaneous addition of step (c) is in the form of an aqueous solution having a normality of between 0.25 N and 8 N.

12. The process of claim 1, wherein the addition of step (c) last between 15 and 300 minutes.

13. The process of claim 1, wherein an aluminum compound is introduced to the medium at the end of step (c), and/or between step (c) and step (e).

14. The process of claim 1, wherein step (d) is used, and in that the acidifying agent from step (d) is introduced to the medium in the form of an aqueous solution having a normality of between 0.25 N and 8.

15. The process of claim 1, wherein steps (a), (b) (c) and (d) are carried out at a temperature of between 90 and 100° C.

16. The process of claim 1, wherein the aqueous silica dispersion resulting from step (d) is subjected to a maturation step, prior to step (e).

17. The process of claim 1, wherein step (e) comprises a process of splitting the precipitate cake.

18. The process of claim 1, wherein in step (c) the pH is substantially constant around a fixed value.

19. The process of claim 18, wherein in step (c) the pH is maintained within +/−0.2 pH units of the fixed value.

20. The process of claim 19, wherein the fixed value is 7.2-7.8.

21. The process of claim 20, wherein the fixed value is 7.3-7.7.

22. The process of claim 1, wherein throughout step (c) the following relationship is maintained:

$d_S/d_A = 1.01 - 1.09;$ wherein,
   $d_s$ = amount of silicate functions expressed as molar equivalent of NaOH introduced per second; and
   $d_A$ = amount of acid functions, in moles, introduced per second. the fixed value is 7.2-7.8.

23. A silica obtained by the process of claim 1.

24. The silica of claim 23 having a water-uptake of less than 6%.

25. A silicone-based matrix in combination with a reinforcing filler, the filler comprising the silica of claim 23.

26. A matrix based on one or more elastomers in combination with a reinforcing filler, the filler comprising the silica of claim 23.

27. The combination of claim 26, wherein said matrix based on one or more elastomers is a transparent or translucent matrix.

28. An article comprising the silica of claim 23, the article comprising one or more of: a thickening agent, a food composition, a cosmetic composition, and a pharmaceutical composition.

* * * * *